US012715101B2

(12) United States Patent
Becker et al.

(10) Patent No.: US 12,715,101 B2
(45) Date of Patent: Aug. 25, 2026

(54) USER INTERFACE CONSTRUCTION AND MOUNTING FOR IMPACTING FASTENING TOOLS

(71) Applicant: Ingersoll-Rand Industrial U.S., Inc., Davidson, NC (US)

(72) Inventors: Daniel J Becker, Monroe Township, NJ (US); Oleksandr Saprykin, Bethlehem, PA (US); James F Bouchard, Easton, PA (US); Daniel M Valanzola, Bethlehem, PA (US); Kevin M Purdy, Charleston, SC (US); Joshua O Johnson, Allentown, PA (US); Wei Dai, Nanjing (CN)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 19/192,857

(22) Filed: Apr. 29, 2025

(65) Prior Publication Data

US 2025/0256386 A1 Aug. 14, 2025

Related U.S. Application Data

(63) Continuation-in-part of application No. 18/909,275, filed on Oct. 8, 2024.

(Continued)

(51) Int. Cl.
*B25F 5/02* (2006.01)
*B25B 21/02* (2006.01)

(52) U.S. Cl.
CPC ................ *B25F 5/02* (2013.01); *B25B 21/02* (2013.01)

(58) Field of Classification Search
CPC ............................... B25B 21/00; B25B 21/02
See application file for complete search history.

(56) References Cited

U.S. PATENT DOCUMENTS 11,571,803 B2 2/2023 Davis et al.
2014/0008088 A1* 1/2014 Chellew ................. B25F 5/021 362/559

(Continued)

FOREIGN PATENT DOCUMENTS

EP 3981550 A1 4/2022
WO 0105559 A2 1/2001

(Continued)

OTHER PUBLICATIONS

Extended European Search Report from European Application No. 24205828.7, dated Apr. 24, 2025.

(Continued)

*Primary Examiner* — Daniel Jeremy Leeds
(74) *Attorney, Agent, or Firm* — Kevin E. West; Advent, LLP

(57) ABSTRACT

A power tool includes a tool housing and a display assembly housed within the tool housing. The display assembly includes a display screen for displaying graphical information about the operation of the power tool and a printed circuit board operatively coupled to the display screen, where the printed circuit board includes control circuitry for the display screen. The display assembly also includes a rigid spacer between the display screen and the printed circuit board that defines cavities for receiving potting material. The display assembly further includes a boat peripherally surrounding and supporting the display screen, the printed circuit board, and the rigid spacer. The power tool also includes an elastomeric gasket seated between the printed circuit board and the boat for isolating the display screen. The power tool can include a protective cover for shielding the display screen.

20 Claims, 15 Drawing Sheets

Related U.S. Application Data

(60) Provisional application No. 63/589,106, filed on Oct. 10, 2023.

(56) References Cited

U.S. PATENT DOCUMENTS

| | | | |
|---|---|---|---|
| 2014/0159919 | A1 | 6/2014 | Furui et al. |
| 2018/0318999 | A1 | 11/2018 | Lovelass et al. |
| 2019/0217460 | A1 | 7/2019 | Mahalingappa et al. |
| 2021/0078146 | A1 | 3/2021 | Araki et al. |
| 2021/0205976 | A1 | 7/2021 | Matei |
| 2022/0176534 | A1 | 6/2022 | Billings et al. |
| 2023/0035494 | A1 | 2/2023 | Larsen |
| 2024/0157525 | A1 * | 5/2024 | Zou ......................... B25B 21/02 |

FOREIGN PATENT DOCUMENTS

| | | | |
|---|---|---|---|
| WO | 2020081424 | A1 | 4/2020 |
| WO | 2023278587 | A1 | 1/2023 |

OTHER PUBLICATIONS

Extended European Search Report from European Application No. 24205829.5, dated Apr. 8, 2025.

* cited by examiner

USER INTERFACE CONSTRUCTION AND MOUNTING FOR IMPACTING FASTENING TOOLS

CROSS-REFERENCE TO RELATED APPLICATIONS

The present application is a continuation-in-part under 35 U.S.C. § 120 of U.S. patent application Ser. No. 18/909,275, filed Oct. 8, 2024, and titled "POWER TOOL AND REMOVABLE USER INTERFACE GUARD," which claims priority under 35 U.S.C. § 119(e) of U.S. Provisional Application Ser. No. 63/589,106, filed Oct. 10, 2023, and titled "POWER TOOL WITH REMOVABLE USER INTERFACE GUARD." U.S. patent application Ser. No. 18/909,275 and U.S. Provisional Application Ser. No. 63/589,106 are herein incorporated by reference in their entireties.

BACKGROUND

A power tool is a tool actuated by a power source other than manual labor.

DRAWINGS

The Detailed Description is described with reference to the accompanying figures. The use of the same reference numbers in different instances in the description and the figures may indicate similar or identical items.

Figure 1:
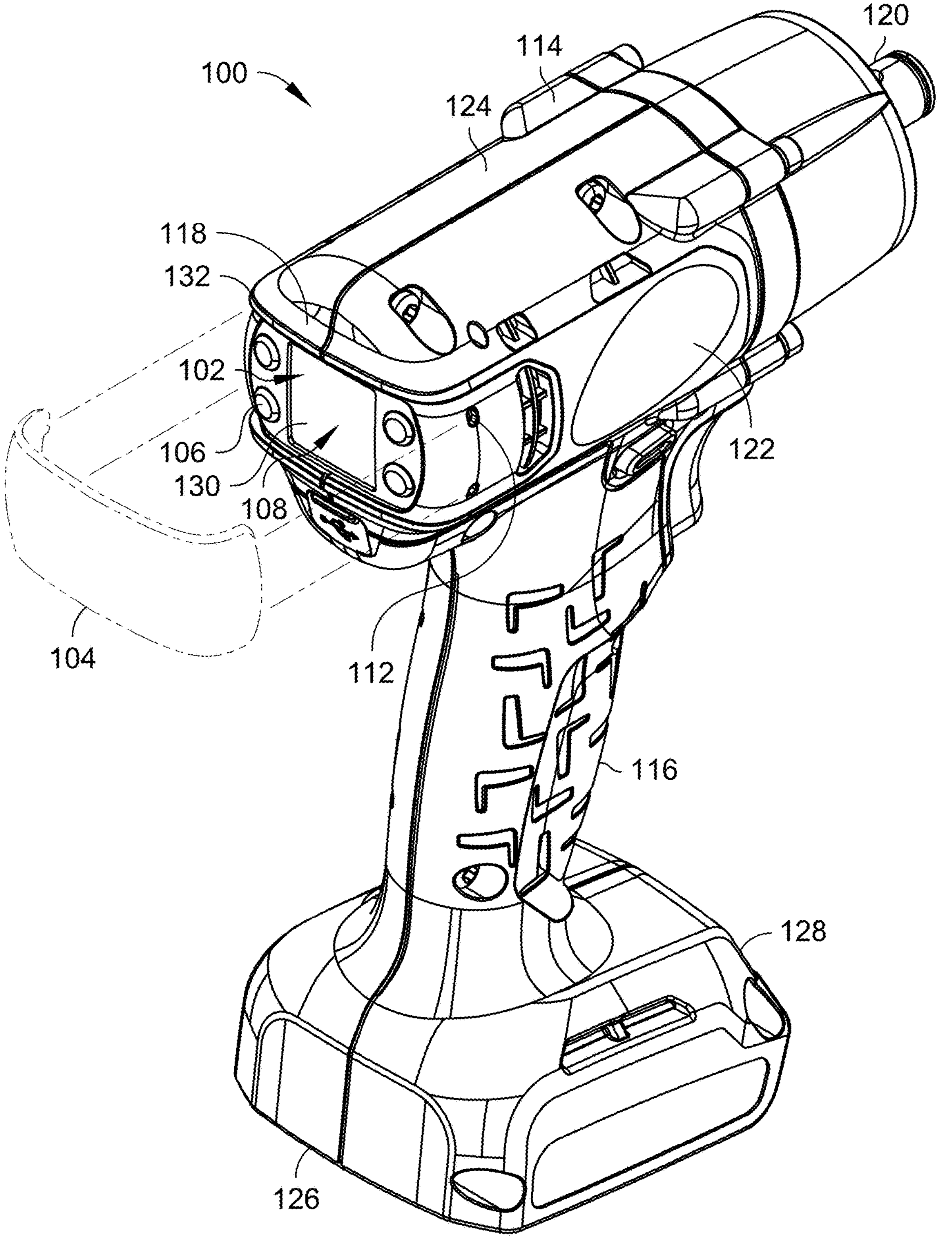
FIG. 1 is an isometric view illustrating an impact tool with a user interface in accordance with example embodiments of the present disclosure.
Figure 2:
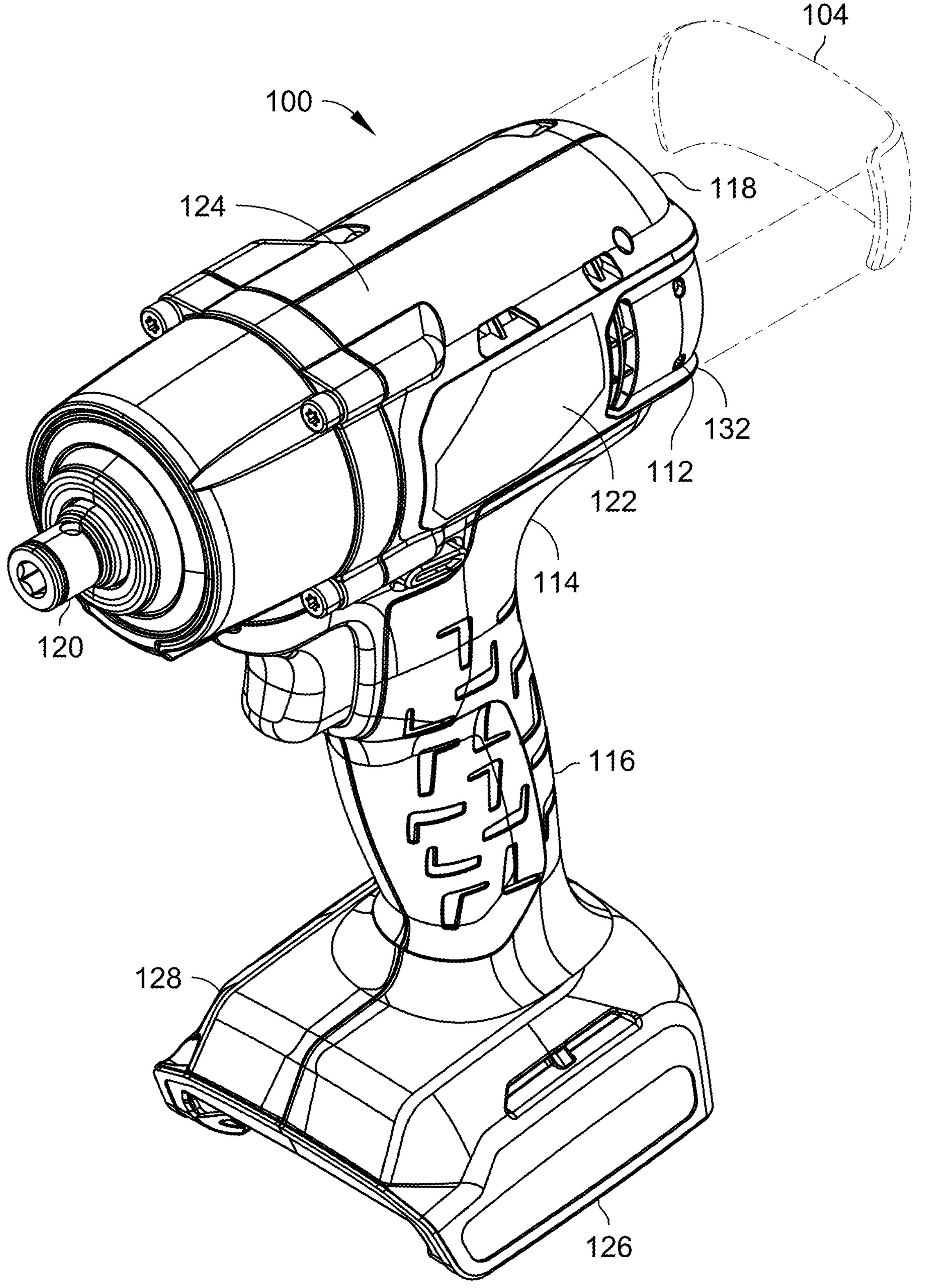
FIG. 2 is another isometric view of the impact tool illustrated in FIG. 1.
Figure 3:
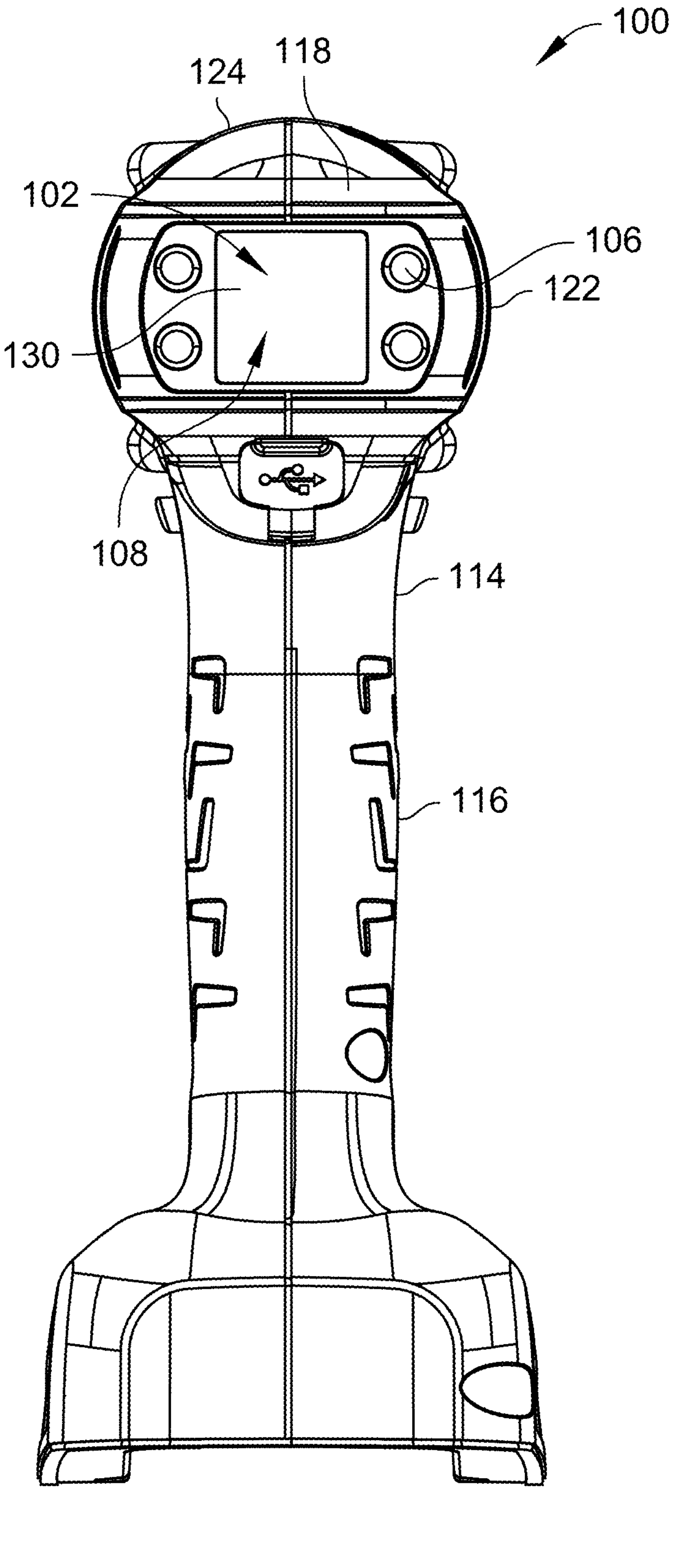
FIG. 3 is a rear elevation view of the impact tool illustrated in FIG. 1.
Figure 4:
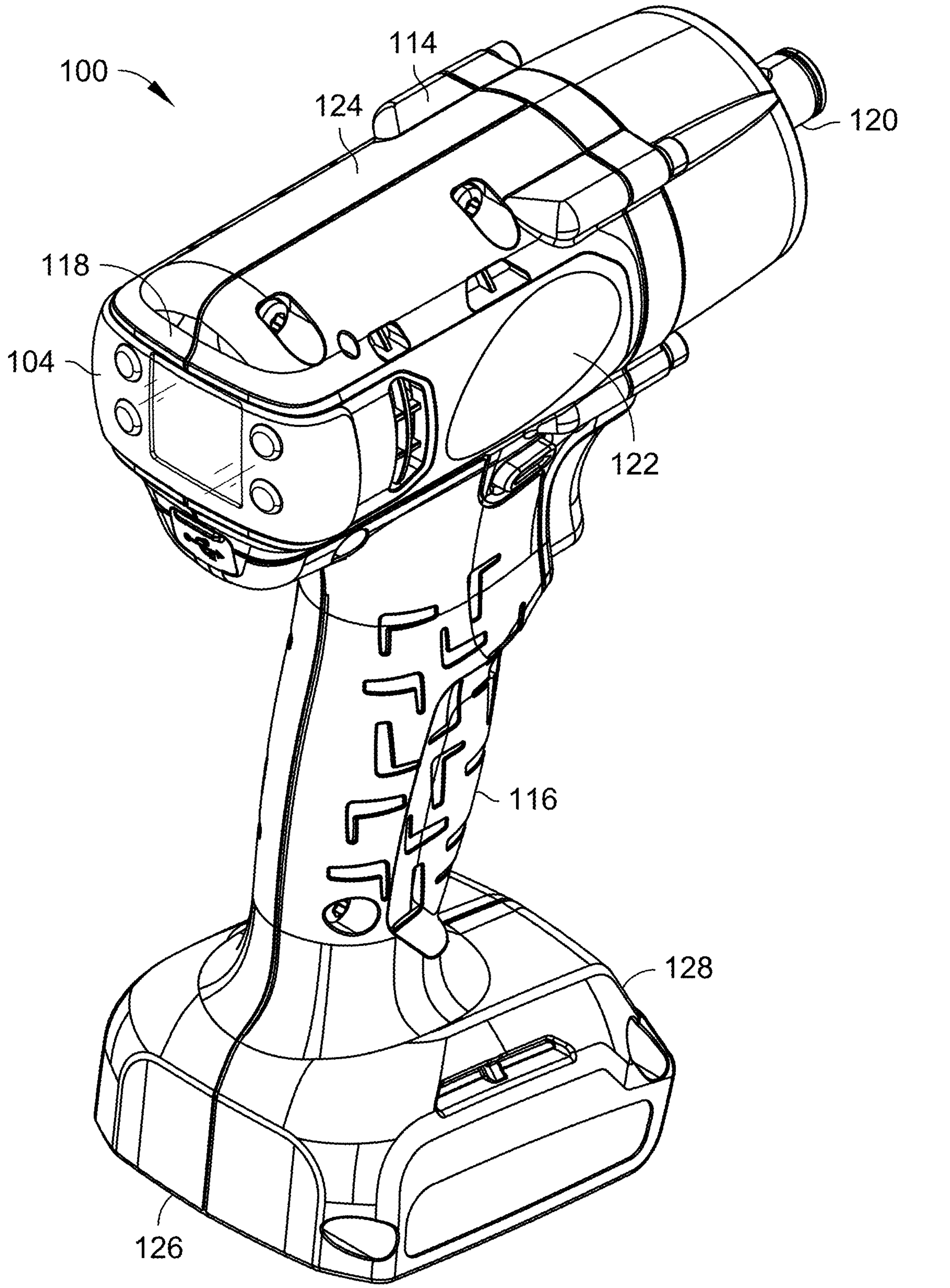
FIG. 4 is an isometric view illustrating an impact tool with a user interface and a removable guard for the user interface in accordance with example embodiments of the present disclosure.
Figure 5:
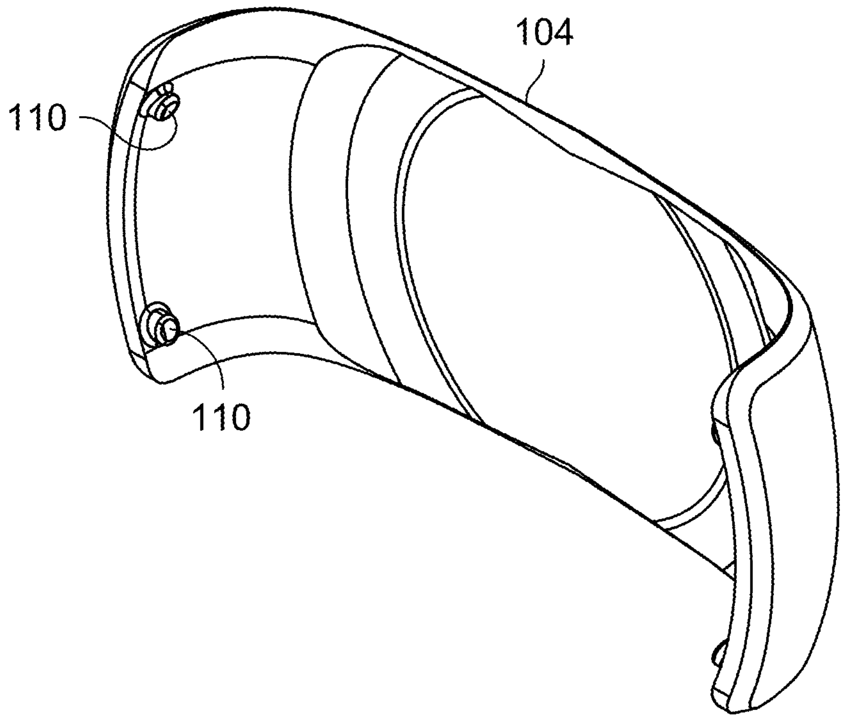
FIG. 5 is an isometric view illustrating a removable guard for a user interface of a power tool, such as the power tools illustrated in FIGS. 1 through 4, in accordance with example embodiments of the present disclosure.
Figure 7:
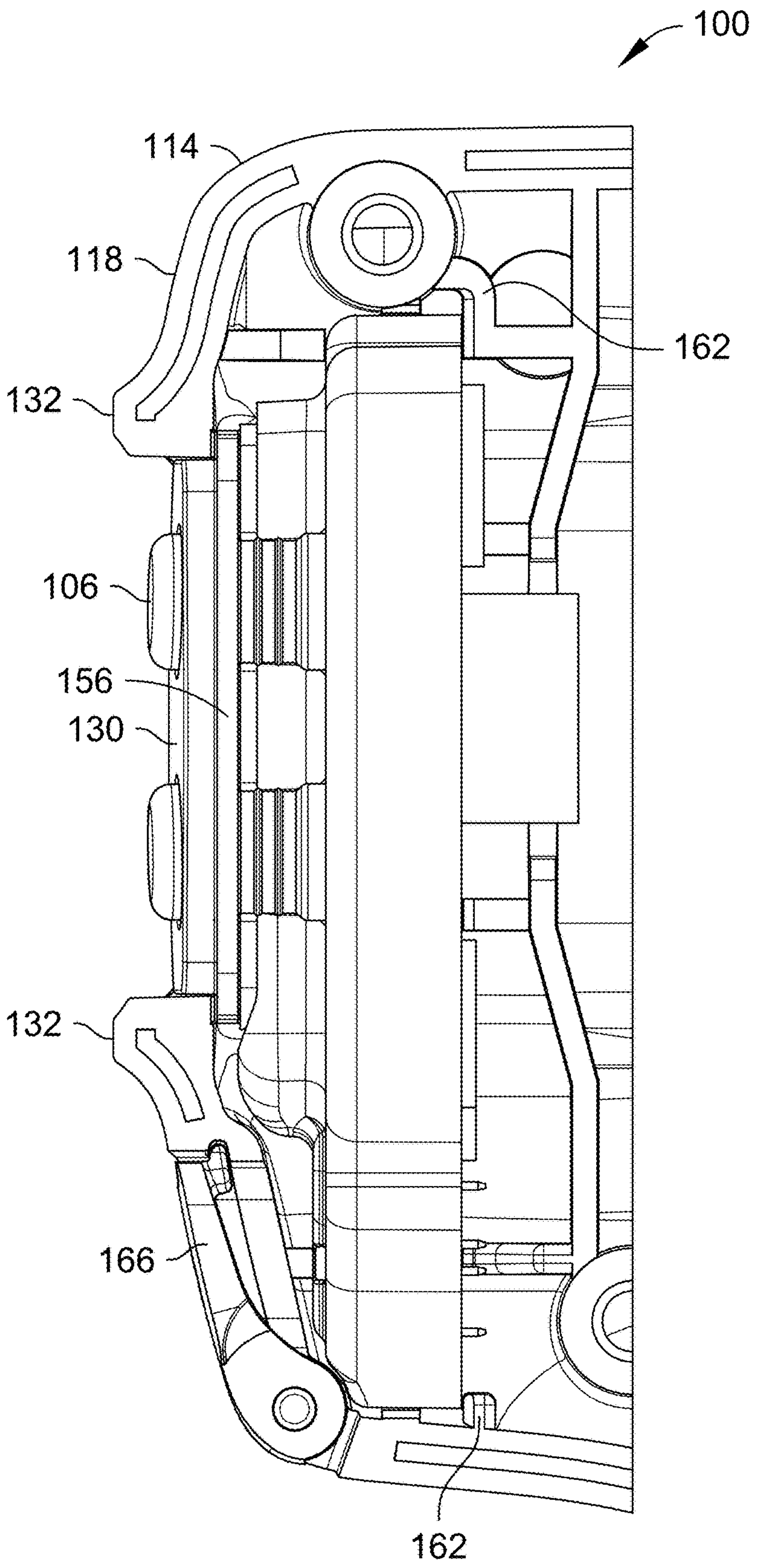

FIG. 7 is a partial cross-sectional side elevation view illustrating a mechanical pulse impact power tool, such as the impact tool illustrated in FIG. 1, with a display assembly housed within a tool housing, where the display assembly includes a display screen, a printed circuit board, a rigid spacer, a boat, and an elastomeric gasket in accordance with example embodiments of the present disclosure.

Figure 8:
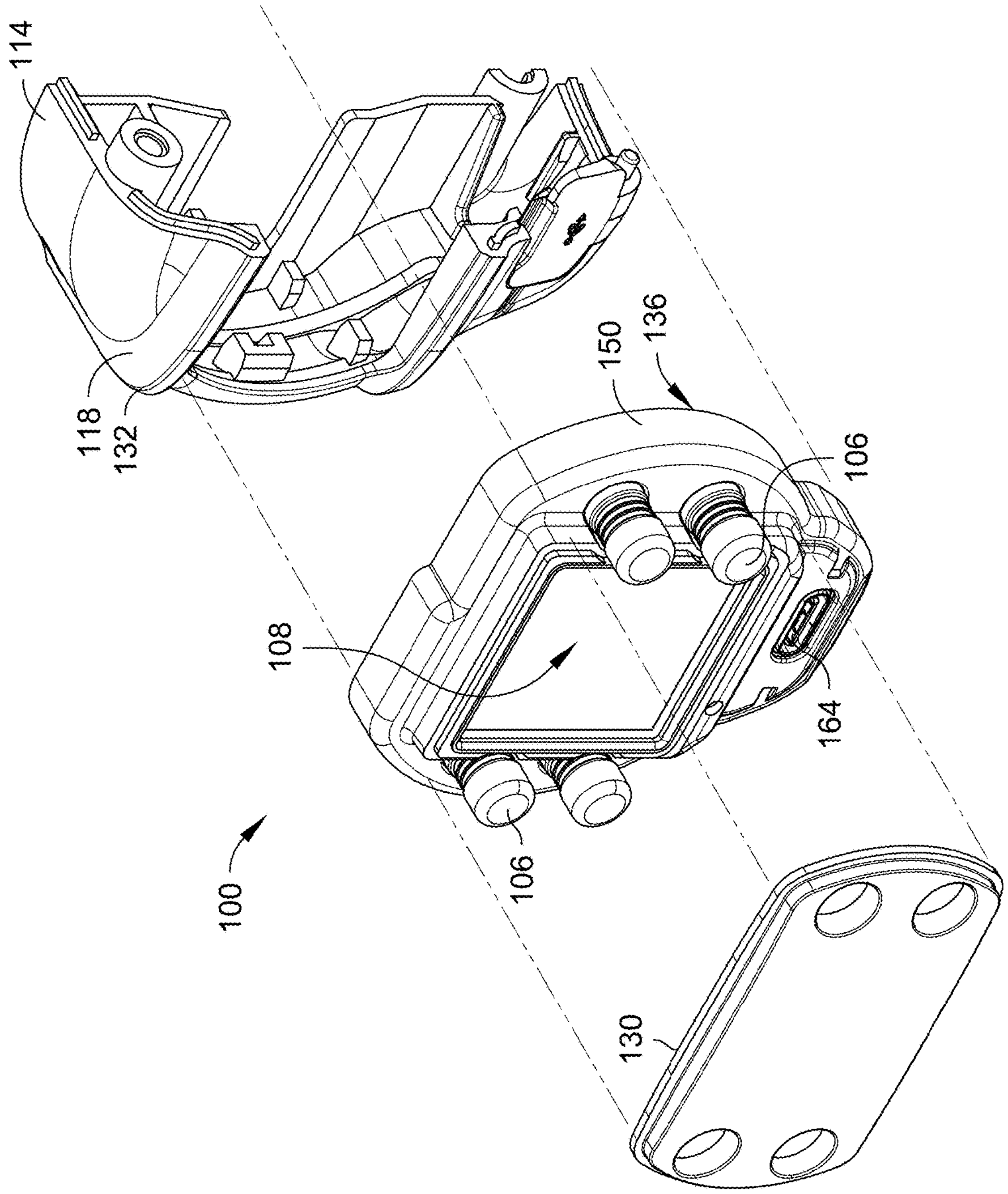

FIG. 8 is a partial exploded isometric view of the mechanical pulse impact power tool illustrated in FIG. 7.

Figure 9:
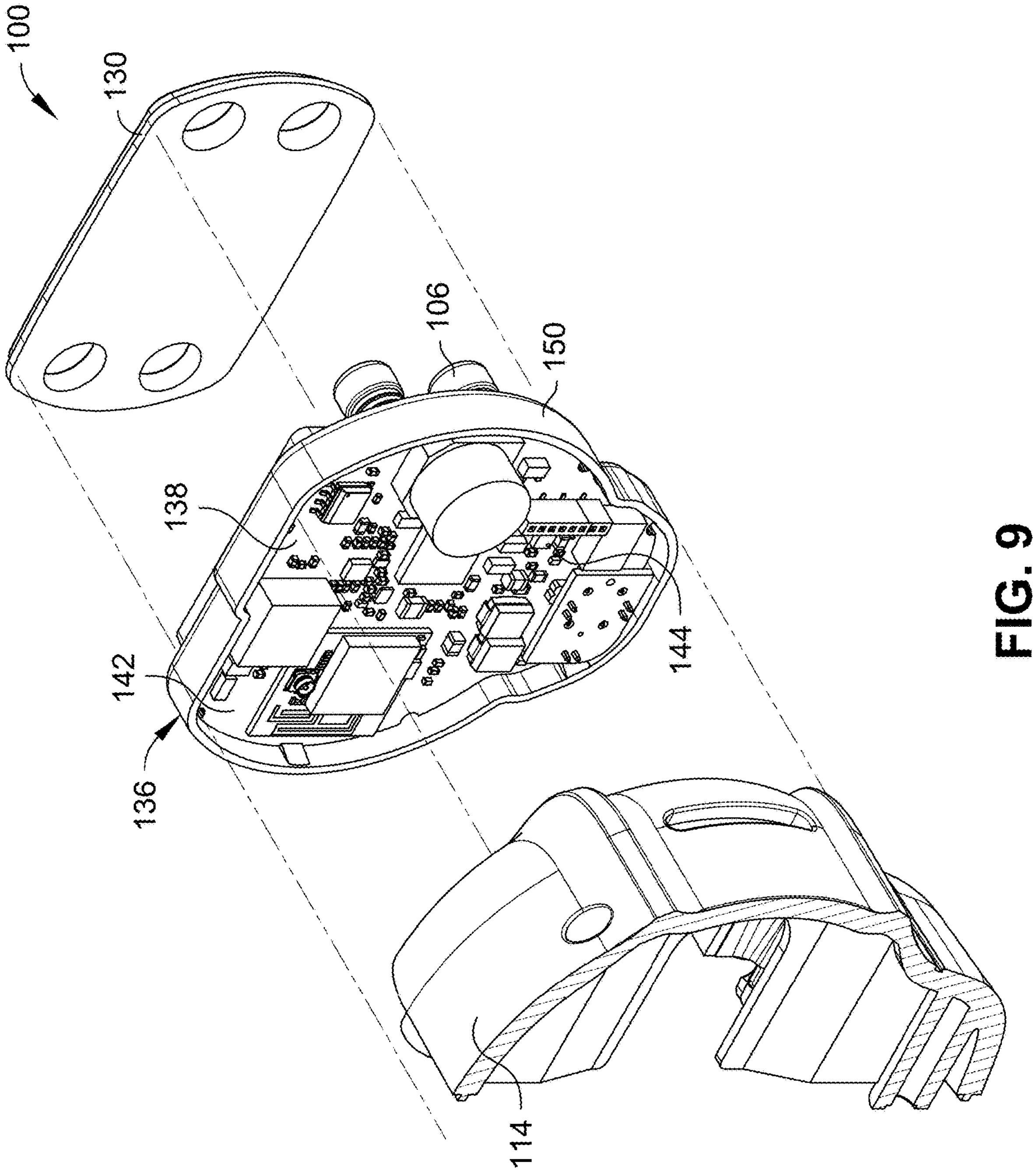

FIG. 9 is another partial exploded isometric view of the mechanical pulse impact power tool illustrated in FIG. 7.

Figure 10:
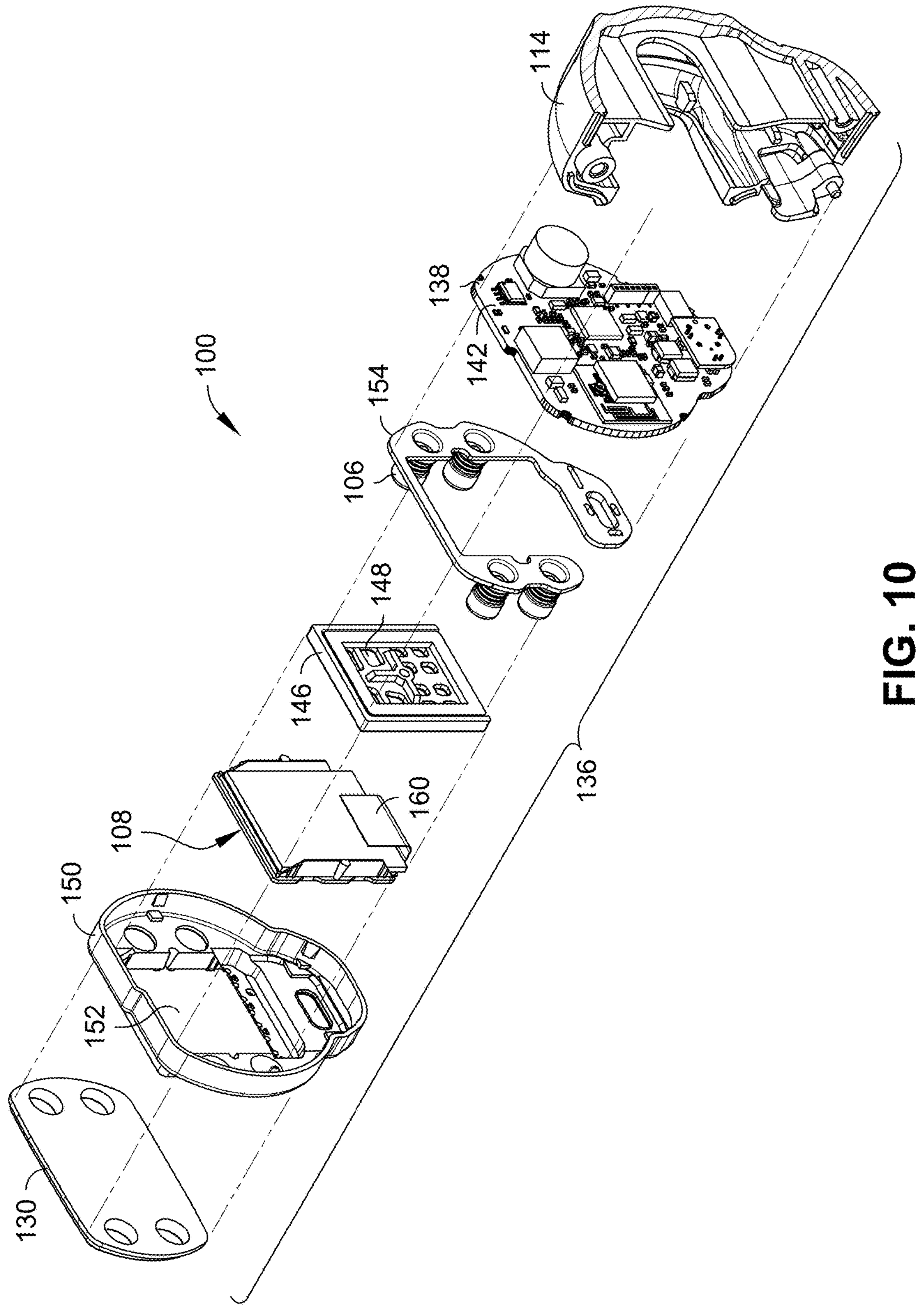

FIG. 10 is a further partial exploded isometric view of the mechanical pulse impact power tool illustrated in FIG. 7.

Figure 11:
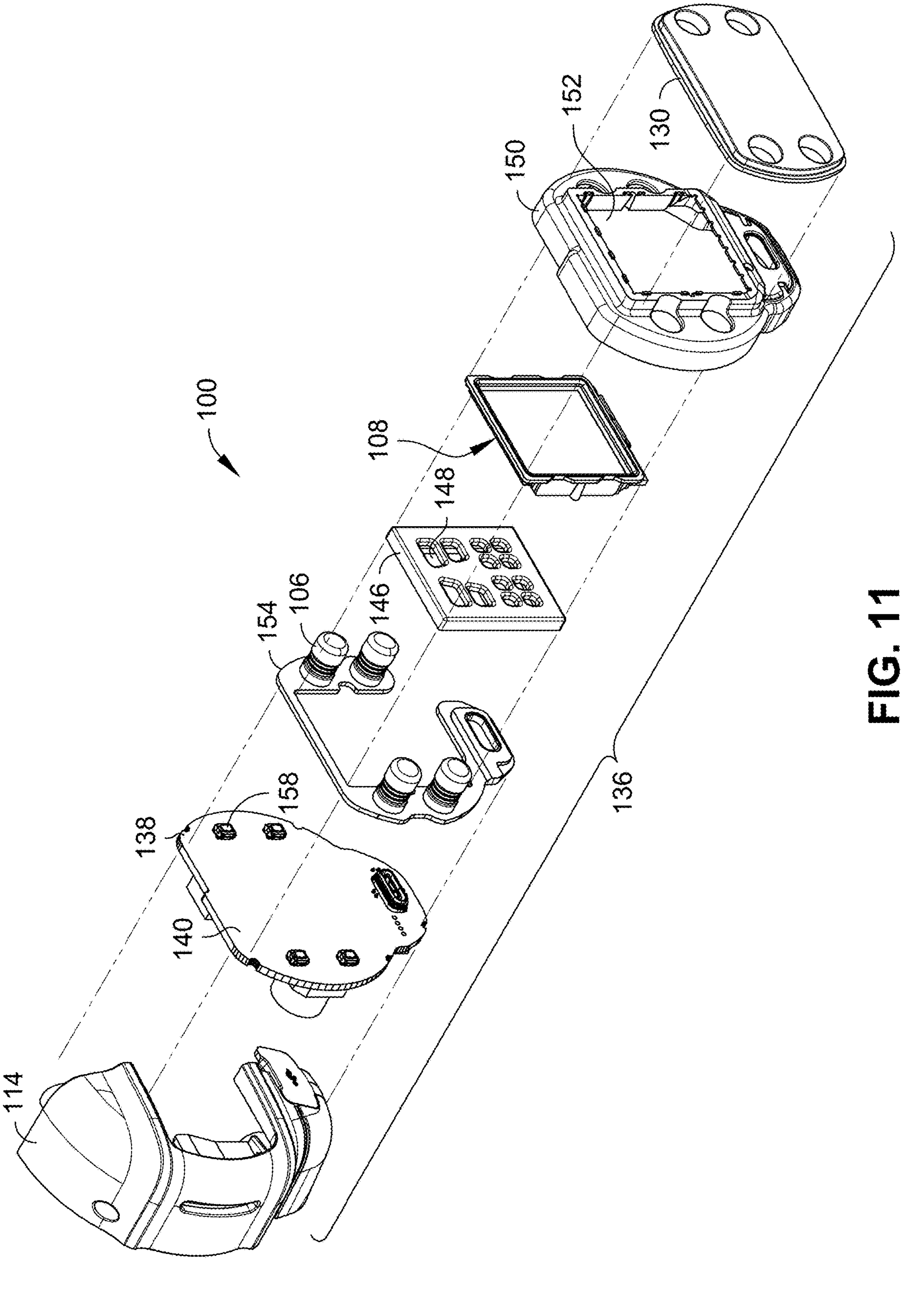

FIG. 11 is another partial exploded isometric view of the mechanical pulse impact power tool illustrated in FIG. 7.

Figure 12:
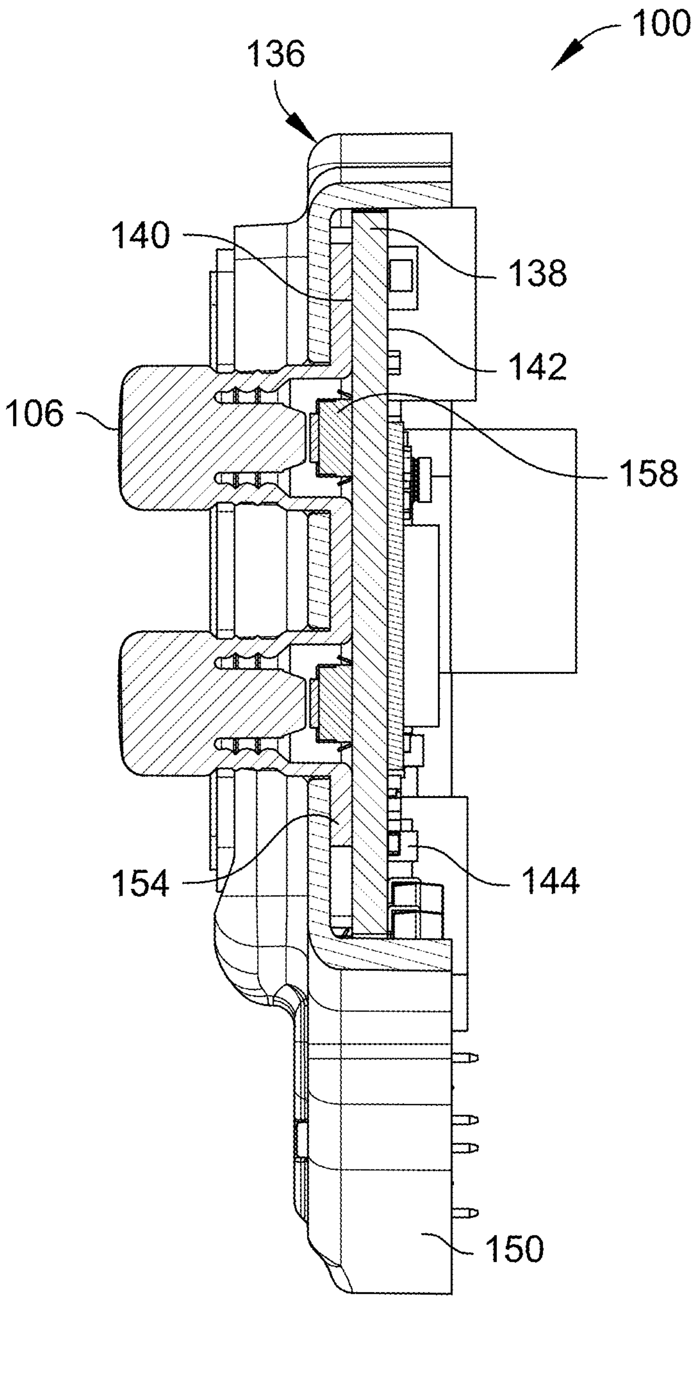

FIG. 12 is a cross-sectional side elevation view of the display assembly illustrated in FIG. 7.

Figure 13:
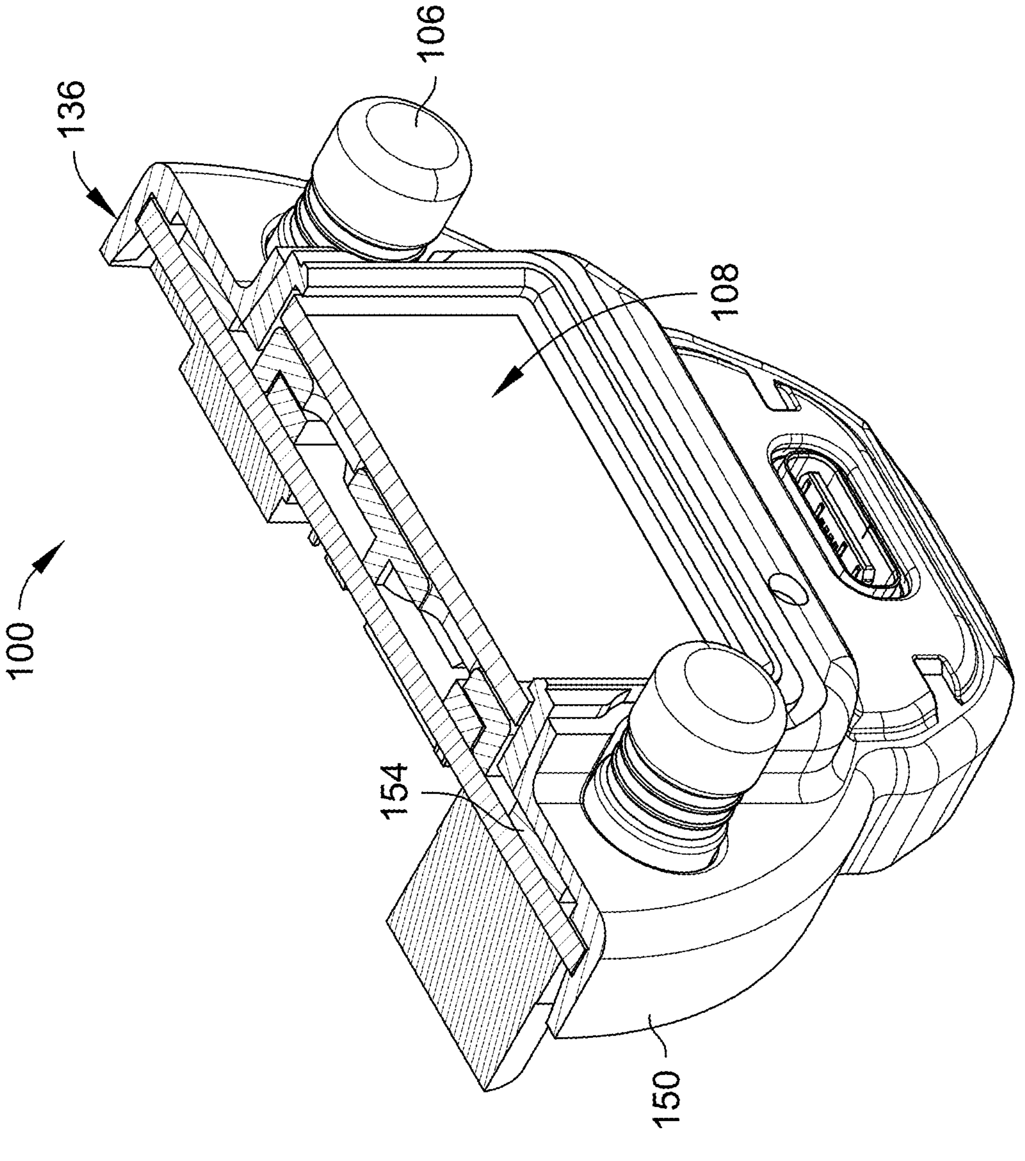

FIG. 13 is a partial cross-sectional isometric view of the display assembly illustrated in FIG. 7.

Figure 14:
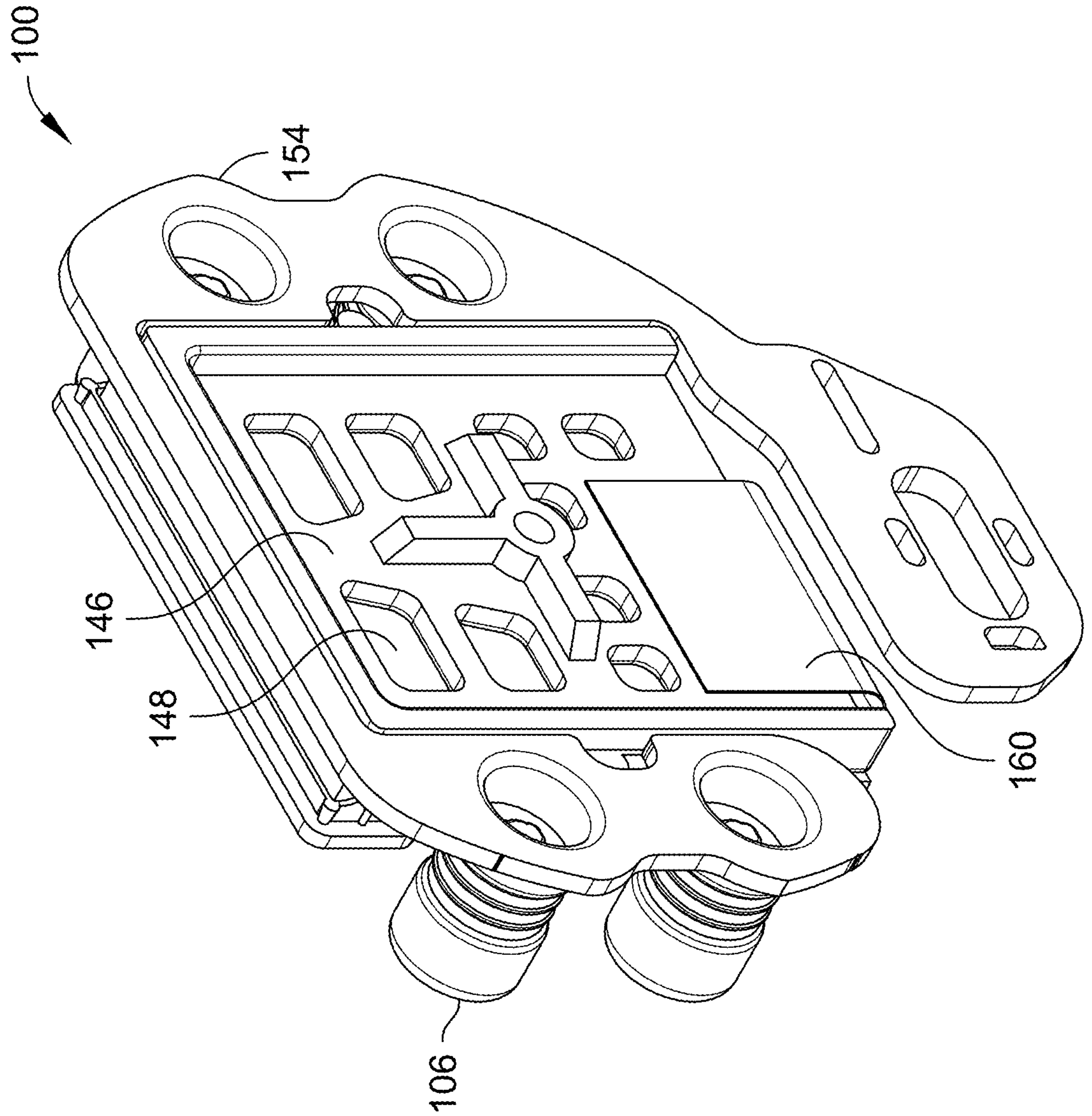

FIG. 14 is an isometric view of the display screen, the rigid spacer, and the elastomeric gasket for the display assembly illustrated in FIG. 7.

Figure 15:
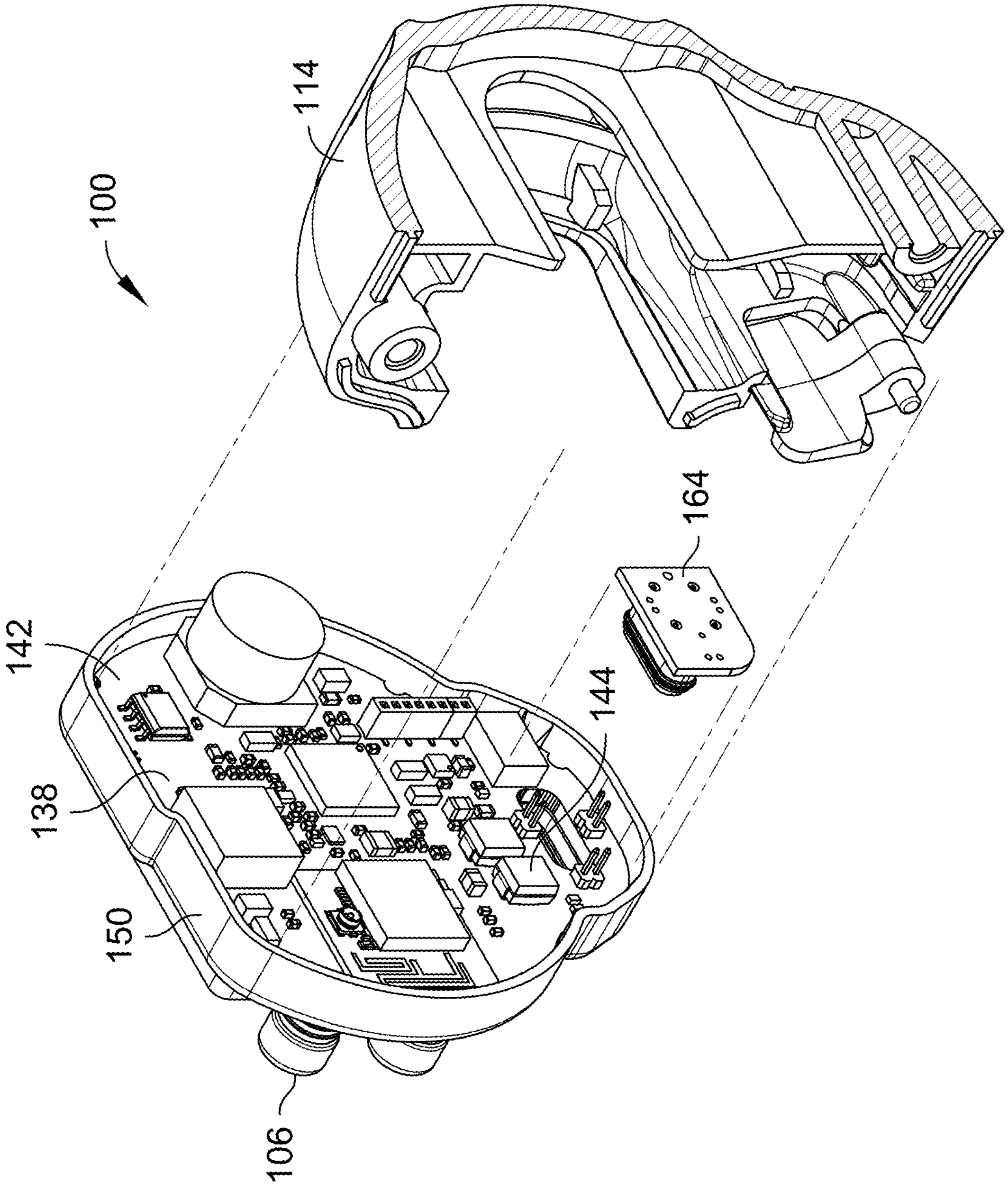

FIG. 15 is another partial exploded isometric view of the mechanical pulse impact power tool illustrated in FIG. 7.

DETAILED DESCRIPTION

Referring generally to FIGS. 1 through 15, power tools 100 having a user interface 102 and a removable user interface guard 104 are described. As described, the removable user interface guard 104 can protect user input and display/feedback components on the power tool 100 from damage and/or inadvertent operation. The removable user interface guard 104 can be securely attached to the power tool 100, easily removed from the power tool 100, and economically replaced. Power tools are commonly used in environments where space is tight. Consequently, such tools are often bumped or scraped against objects that occupy this space. User interface components such as electronic displays can sustain damage from this contact. Furthermore, user input controls such as keypad buttons can be actuated from this contact, causing unintended changes to the tool's operation and/or setup. The systems, apparatus, and techniques described herein can provide physical protection to these components to prevent these undesirable outcomes.

The removable user interface guard 104 is a strong and durable guard that attaches to the power tool 100 and covers the user interface 102 and user input controls (e.g., buttons 106). The removable user interface guard 104 receives the bumps and scrapes that would otherwise be delivered to the user interface 102 and user input components. In some embodiments, the removable user interface guard 104 can be transparent so as to retain visibility of a display screen 108, such as a liquid crystal display (LCD) screen or another type of screen, which shows important feedback to the operator about the power tool 100, such as cycle status.

In some embodiments, the removable user interface guard 104 is a transparent cover. The removable user interface guard 104 can include protruding features 110 that can engage with recesses 112 in the housing 114 of the power tool 100 for secure attachment. In some embodiments, each side of the removable user interface guard 104 includes multiple (e.g., two, more than two) protruding features 110 that can engage with multiple corresponding recesses 112 in each side 122 of the housing 114 (e.g., as shown in FIGS. 1 through 5). In some embodiments, each side of the removable user interface guard 104 includes a single protruding feature 110 that engages with a corresponding recess 112 in each side 122 of the housing 114. However, it should be noted that the protruding features 110 and recesses 112 are provided by way of example and are not meant to limit the present disclosure. Other attachment features can also be used to attach the removable user interface guard 104 to the housing 114, such as protruding features on a housing with recesses on a guard, and so forth. Additionally, such features can be mechanically actuated, such as spring biased, and so forth.

The removable user interface guard 104 can cover the display screen 108 to provide additional protection and can cover the buttons 106 of the user interface 102 to protect them and/or prevent them from being actuated when not intended. In instances where operators do not need to actuate these controls, a cover may be preferred to protect the components and/or to deter operators from accessing them.

The removable user interface guard 104 can be removed when access to the buttons 106 is needed, and it may be easily replaced if it were to sustain damage. In some embodiments, there is clearance between the removable user interface guard 104 and the components that the removable user interface guard 104 covers, e.g., to allow for deformation that may occur if the power tool 100 were to be dropped or impacted. In some embodiments, the removable user interface guard 104 can be constructed from a strong, transparent or semi-transparent material, such as transparent polycarbonate, which can provide durability to sustain abuse, an ability to deform so that the part may be snapped onto the tool and removed from it, and/or low cost.

In some embodiments, the power tool 100 is a pistol grip type power tool, such as an impact tool having a pistol grip 116. However, a power tool 100 with a pistol grip 116 is provided by way of example and is not meant to limit the present disclosure. In other embodiments, a power tool 100 can be another type of power tool, including, but not necessarily limited to: an in-line tool, a right-angle tool, and so forth.

As described, the user interface 102 can be positioned on a back side 118 of the power tool 100. For instance, the user interface 102 can be positioned opposite a working end 120 of the power tool 100, e.g., facing an operator of the power tool 100 when the operator grips and uses the tool. This placement allows the operator to have good visibility to information displayed on the display screen 108, such as visual feedback. In one example, such feedback can include different colored icons providing an indication of whether an actuator of the power tool 100, such as a trigger, has been actuated for a sufficiently long time to complete an operation on a workpiece (e.g., a red icon indicating an early release of the trigger before completion of an operation). However, a power tool 100 with a user interface 102 positioned on the back side 118 of the power tool 100 is provided by way of example and is not meant to limit the present disclosure. In other embodiments, the user interface 102 can be positioned in one or more other locations, including, but not necessarily limited to: a side 122 of the power tool 100, a top 124 of the power tool 100, a bottom 126 of the power tool 100, at a foot 128 of the power tool 100, and so on.

In some embodiments, having user interface and user input controls located on the back side 118 of the power tool 100 allows the display screen 108 to be readily visible to the operator during use, e.g., for cycle status monitoring. Additionally, the controls are readily accessible for on-tool programming. However, the back side 118 of the power tool can be susceptible to damage and/or unintended actuation. The removable user interface guard 104 offers a secondary layer of protection with a component that is removable and replaceable. This gives more confidence to users and purchasers of the power tool that their investment is well-protected.

For example, positioning the user interface 102 on the back side 118 of the power tool 100 may provide for enhanced convenience and/or accessibility for an operator. However, in some instances the back side 118 of the power tool 100 can be subject to rough handling. For example, an operator may use the back side 118 of a power tool 100 that functions as an impact tool to hammer or pound on a workpiece. In many instances, an impact tool or another expensive power tool 100 may be owned and/or maintained by a company that employs operators who may not be diligent about protecting the back side 118 and the user interface 102 of the power tool 100 (and/or other side(s) where the user interface 102 can be positioned).

In some embodiments, the display screen 108 of the user interface 102 is covered by a transparent or at least semi-transparent display screen cover 130 extending over the display screen 108, where the display screen 108 and the display screen cover 130 are supporting by the housing 114 of the power tool 100. In some embodiments, the display screen cover 130 is made from a tough, impact resistant material, such as a polycarbonate material. However, a display screen cover 130 made from a polycarbonate material is provided by way of example and is not meant to limit the present disclosure. In other embodiments, a display screen cover 130 can be made from one or more other tough and/or impact resistant materials. As described, the display screen cover 130 provides a first layer of protection for the display screen 108.

In embodiments, the user interface 102 also includes one or more selection buttons 106 and/or other actuation features for interacting with the power tool 100. In some embodiments, the power tool 100 includes four (4) selection buttons 106, with sets of two (2) buttons 106 each positioned on opposite sides of the display screen cover 130. As described, a selection button 106 can be used to set one or more desired operational parameters for the power tool 100 via the user interface 102. Operational parameter selections can be displayed via the display screen 108. Such operational parameters can include, but are not necessarily limited to: torque, revolutions per minute (RPM), and so forth.

In some instances, an owner or a manager of the power tool 100 may set one or more operational parameters for the power tool 100 prior to assigning the power tool 100 to an operator. For example, the owner or manager may employ the user interface 102 to set an operational torque for the power tool 100 as required for a particular job prior to assigning the power tool 100 to an operator. As previously discussed, the owner or manager may wish to protect the user interface 102, including the display screen cover 130 and the selection buttons 106, from rough or inadvertent handling, from idle handling, from fidgeting, and so forth. The owner or manager may also wish to prevent contact with the user interface 102, including the display screen cover 130 and the selection buttons 106, which could alter desired settings for the power tool 100. Thus, the power tool 100 may provide a second layer of protection.

In some embodiments, the second layer of protection can include one or more protrusions (e.g., ridges 132), which can be defined by the housing 114 of the power tool 100 and positioned proximate to (e.g., immediately above and/or below) the display screen cover 130. The ridges 132 can protect the display screen cover 130 and/or the selection buttons 106 from an impact by the back side 118 of the power tool 100 with a surface, e.g., by offsetting the user interface 102 from the surface when the back side 118 impacts the surface. It should be noted that the second layer of protection can provide both real protection for the power tool 100 when in use by the operator, as well as perceived protection for an owner or manager of the power tool 100.

As described, the second layer of protection can also be implemented with the removable user interface guard 104, which can attach to the housing 114 of the power tool 100 over (e.g., covering) the user interface 102. In some embodiments, the removable user interface guard 104 can wrap around the power tool 100 to cover or partially cover one or more sides 122 of the power tool. For example, the removable user interface guard 104 can cover the user interface 102 on the back side 118 of the power tool 100 and may also wrap around the two sides 122 of the power tool 100 immediately adjacent to the back side 118. In embodiments of the disclosure, the removable user interface guard 104 can be an inexpensive, easily replaceable part, which can add to the real and/or perceived protection of the power tool 100 offered by the second layer of protection.

In some embodiments, the removable user interface guard 104 is made from a tough, impact resistant material, such as a polycarbonate material. However, a removable user interface guard 104 made from a polycarbonate material is provided by way of example and is not meant to limit the present disclosure. In other embodiments, the removable user interface guard 104 can be made from one or more other tough and/or impact resistant materials, including, but not necessarily limited to: acrylic materials, metal materials, composite materials, and so forth. From the perception of an owner or manager of a power tool 100, the removable user interface guard 104 can be thought of as "safety glasses" for the power tool. In some embodiments, when the power tool 100 is purchased, the power tool 100 can include multiple (e.g., two, more than two) removable user interface guards 104, which may be easily interchanged and replaced in case of damage.

In some embodiments, the removable user interface guard 104 can be transparent or at least semi-transparent. In other embodiments, the removable user interface guard 104 can be opaque. In some embodiments, the removable user interface guard 104 can act as a lens. For example, the removable user interface guard 104 can transmit light from the display screen 108 directly through the material of the removable user interface guard 104, providing no magnification. In other embodiments, the removable user interface guard 104 can act as a magnifying lens, which can increase the apparent size of the display screen 108 when viewed through the removable user interface guard 104. Further, in some embodiments, the removable user interface guard 104 can include one or more coatings and/or surface finishes, such as glare reduction features, reflection reduction features, privacy filter features, color filter features, and so forth.

In some embodiments, the removable user interface guard 104 can be quickly and easily removed from the power tool 100. For instance, the removable user interface guard 104 can slide between the ridges 132 proximate to the user interface 102 (e.g., via dovetail type connections). In other embodiments, the removable user interface guard 104 cannot be easily removed from the power tool 100. In an example, the removable user interface guard 104 can include one or more protruding features 110 on each side of the removable user interface guard 104, which can mate with matching recesses 112 on the sides 122 of the housing 114. In some embodiments, the removable user interface guard 104 can be sufficiently stiff, and/or the fit between the removable user interface guard 104 and the housing 114 can be sufficiently snug, so as to prevent the removable user interface guard 104 from being easily removed from housing 114, e.g., by idle operator activity, such as fidgeting with the removable user interface guard 104 by attaching and detaching it from the housing 114. In this example, a screwdriver or another auxiliary tool may be used to lever the removable user interface guard 104 from the housing 114.

In some embodiments, the removable user interface guard 104 can be connected to the housing of the power tool via a hinge or another attachment mechanism, where the removable user interface guard 104 can be hinged out and away from the power tool 100, but also removed from the power tool 100, e.g., by pulling the removable user interface guard 104 from the housing 114 at the hinge connection, which can be, for example, a friction fit. In some embodiments, the removable user interface guard 104 can include one or more resilient attachment features, e.g., elastomeric overmolding on the polycarbonate lens, which can be compliant for absorbing impacts, such as a drop onto the back side 118 of the power tool 100, and/or which may also provide a seal for preventing material (e.g., moisture, debris, etc.) from infiltrating past the removable user interface guard 104 to the user interface 102.

In some embodiments, the removable user interface guard 104 can be semi-permanently attached to the power tool 100 (e.g., secured with an auxiliary tool and not removable without the auxiliary tool, such as a screwdriver). For instance, the removable user interface guard 104 can be connected to the housing 114 by one or more fasteners (e.g., screws), which can be inserted through the removable user interface guard 104 and connected to the sides 122 of the housing 114 (e.g., via threaded connection(s) to the housing 114).

As described, portions of the removable user interface guard 104 can be offset from the display screen cover 130 and/or the selection buttons 106. The offset can be used to prevent the removable user interface guard 104 from contacting the user interface 102 if it deforms (e.g., bows inwardly) in an impact to the back side 118 of the power tool 100. In some embodiments, the removable user interface guard 104 can be offset from the selection buttons 106 a sufficient distance for an operator to access a selection button 106 by reaching behind the removable user interface guard 104 to contact a selection button 106. In some embodiments, the removable user interface guard 104 can include one or more compliant features, such as flexible, co-molded buttons that can be used to press the selection buttons 106 by pressing on the removable user interface guard 104 at the buttons 106.

Figure 6:
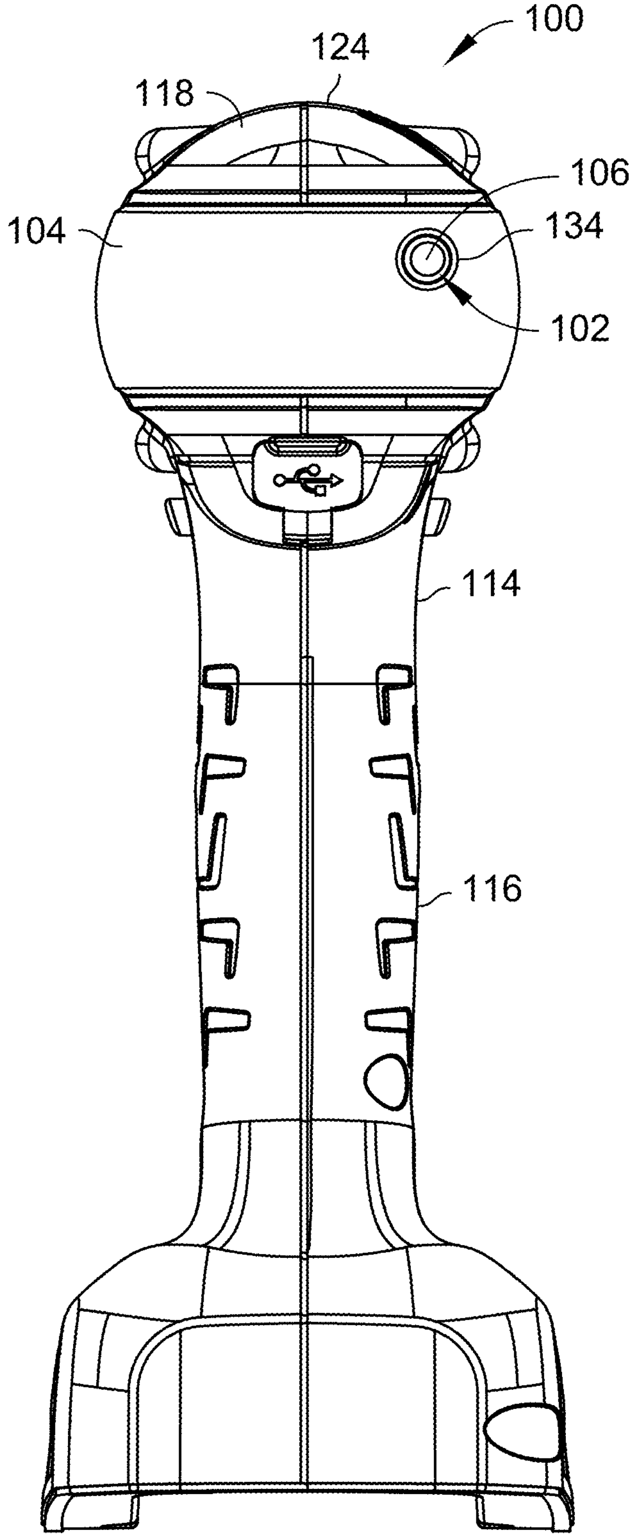
FIG. 6 is a rear elevation view illustrating an impact tool with a user interface and a removable guard for the user interface in accordance with example embodiments of the present disclosure.

With reference to FIG. 6, in some embodiments the removable user interface guard 104 can include an access port 134, such as an aperture or another type of access point, for accessing a button 106 (or buttons) through the removable user interface guard 104. The access port 134 can be used to provide access to a button 106 (or buttons) that may be frequently accessed during operation of the power tool 100 and would otherwise require frequent attachment and detachment of the removable user interface guard 104. For example, an access port 134 can be used to facilitate access to a button used for changing between operational presets store in the power tool 100 (e.g., to change operational modes of the tool).

As described, the protrusions/ridges 132 defined by the housing 114 of the power tool 100 and positioned proximate to the display screen cover 130 can be shaped to create an aesthetically pleasing form factor for the power tool 100, e.g., in combination with the removable user interface guard 104. For example, the removable user interface guard 104 can rest between the ridges 132, completing an arcuate profile at the back side 118 of the power tool 100.

Referring now to FIGS. 7 through 15, the power tool 100 can be an impacting or pulsing fastening tool, such as a mechanical pulse impact power tool. As described, the user interface 102 and user input controls/buttons 106 provide a convenient way for an operator to interact with the power tool 100 and make selections. For example, the display screen 108 can be a color, high-resolution display screen (e.g., an LCD screen). The user interface 102 can offer a great deal of information, ease of setup, and versatility for an operator. Information that can be viewed on the color display screen includes, but is not necessarily limited to: presets selected for operation; cycle results, such as successful completion, or unsuccessful completion, and a reason for the results; batch count status and batch completion; an indication when a fault occurs, and a fault code for troubleshooting; battery charge level; maintenance alarm status; connection status; tool information (e.g., model number, serial number, certification numbers, date, time); and so forth.

Aspects of tool operation that can be controlled via the user interface 102 and buttons 106 include, but are not necessarily limited to: connections, such as connections to a controller, connections to an application (app), disconnection and operation as a standalone unit; an active preset, such as a different preset selected for operation; a preset definition, such as defining a preset by choosing a power level, choosing a flush-detection level, choosing a direction of controlled tightening (clockwise for tightening right-handed threaded fasteners, counter-clockwise for tightening left-handed fasteners), and choosing the number of fasteners in a batch; and so on. However, with a user interface of this sophistication, and especially one positioned on the rear of an impacting/pulsing fastening tool, special provisions are needed for the user interface to endure the high level of vibration from within the tool, and/or the high level of potential torment from the operator and the environment.

In embodiments, a power tool 100, such as a mechanical pulse impact power tool, includes a display assembly 136 housed within the tool housing 114. The display assembly 136 includes the display screen 108 for displaying graphical information about the operation of the power tool 100. In some embodiments, the display screen 108 is a full color, high-resolution display screen, which has been assembled in multiple layers. For example, the display screen 108 includes two layers of glass with a layer of liquid crystals between the glass layers. Electrical circuit traces can be used to selectively activate the liquid crystals. The display screen 108 can also include a light source and a reflector (e.g., a metal mirror) to illuminate the display screen 108. However, it should be noted that this display screen assembly is provided by way of example and is not meant to limit the present disclosure. Thus, in other embodiments, an LCD display screen may be configured differently (e.g., using a backlight). Other types of display screens may also be used, including, but not necessarily limited to, an organic light-emitting diode (OLED) display screen, and so forth.

The display assembly 136 also includes a printed circuit board 138 operatively coupled to the display screen 108, where the printed circuit board 138 has a first side 140 proximate to the display screen 108 and a second side 142 opposite the first side 140. In embodiments, the second side 142 of the printed circuit board 138 can include control circuitry 144 for the display screen 108. For example, a microprocessor and a wireless radio can be attached to the second side 142 of the printed circuit board 138, where the microprocessor can be used to control the display screen 108 and other functions of the power tool 100, and the wireless radio can be used for wireless communications between the power tool 100 and external devices. The printed circuit board 138 may also include microswitches 158 or other devices for receiving inputs from mechanical action of the buttons 106. However, microswitches are provided by way of example and are not meant to limit the present disclosure. In other embodiments different actuatable devices can be used with the buttons 106, including, but not necessarily limited to, membrane switches, and so on.

The display assembly 136 further includes a spacer 146 (e.g., a rigid spacer) between the display screen 108 and the printed circuit board 138 for spacing the display screen 108 apart from the printed circuit board 138. For example, the spacer 146 can be a rigid plastic standoff to which the display screen 108 is mounted. The spacer 146 serves to position the display screen 108 in close proximity to the rear of the power tool 100 for enhanced visibility. The spacer 146 also serves to achieve a more gradual transition from the display screen 108 to the printed circuit board 138. For instance, the display screen 108 is connected to the control circuitry 144 via a ribbon cable 160. The spacer 146 allows the ribbon cable 160 to gradually bend from the display screen 108 to the control circuitry 144, e.g., as opposed to folding the ribbon cable onto itself, such as when a display screen is affixed directly to a PCB using double-sided tape. The rigid spacer 146 also serves to insulate the display screen 108 from mechanical loads applied to the power tool 100. For example, when mechanical vibrations or forces are applied to the display screen 108, the forces are spread through the spacer 146 and reduce stress concentrations on pressure sensitive components of the display screen 108. In embodiments, the spacer 146 defines multiple cavities 148 for receiving potting material, such as glue, to affix the display screen 108 to the spacer 146 and/or to affix the spacer 146 to the printed circuit board 138.

The display assembly 136 also includes a carrier or boat 150 for supporting the display screen 108, the printed circuit board 138, and the spacer 146, where the boat 150 peripherally surrounds the display screen 108, the printed circuit board 138, and the spacer 146. The boat 150 includes an aperture 152 for providing visibility to the display screen 108. In some embodiments, the boat 150 can be captured by features of the housing 114, such as ribs 162 on left and right clamshell halves of the housing. In this manner, the boat 150 can be held securely in place when two halves of the housing 114 are fastened together (e.g., using fasteners such as screws). In some embodiments, ultraviolet (UV) light curable glue or another adhesive can be used to create a seal around the perimeter of the printed circuit board 138 and the boat 150, and possibly to seal vias in the printed circuit board 138. Potting material can be applied over second side 142 of the printed circuit board 138 within the boat 150 to protect components from vibration and contaminants. In some embodiments, the boat 150 can include compliant overmolding to fill gaps between the display screen 108 and the lens/display screen cover 130, e.g., to protect the display area from contamination and to form a viewing frame around the display area. The compliant overmolding may be the only direct contact between the lens/display screen cover 130 and the display screen 108, so the electronic display can be protected from external forces applied to the lens.

The display assembly 136 further includes an elastomeric gasket 154 seated between the printed circuit board 138 and the boat 150 for isolating the display screen 108. In some embodiments, the elastomeric gasket 154 can include a flexible button pad with compressible tubular shafts entrapped between the first side 140 of the printed circuit board 148 and the carrier/boat 150. The shafts align with the microswitches 158 on the PCB. The shafts protrude through the carrier/boat 150 and through the lens/display screen cover 130. As such, when a button 106 is pressed by an operator, it activates the corresponding microswitch 158 and then returns to its normal position when released. The elastomeric gasket 154 can provide a seal for the glue/potting material and encapsulate the microswitches 158, providing protection to the microswitches 158 and the display screen 108 from contaminants.

As previously described, the power tool 100 also includes the protective display screen cover 130 for shielding the display screen 108, where the display screen cover 130 is disposed on an outside of the housing 114 and offset from the display screen 108 to provide a gap 156 between the display screen 108 and the display screen cover 130. In some embodiments, the power tool 100 can include a communications port 164, such as a USB-C port or another communications port coupled with the circuitry of the printed circuit board 138. In some embodiments, the communications port 164 can be included on a smaller printed circuit board mounted to the printed circuit board 138 and recessed within the power tool 100. For example, the communications port 164 can be flush with an external face of the boat 150. Further, the power tool housing 114 can include an openable cover 166 over the communications port 164 to insulate the port from debris, impacts, and so forth.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A mechanical pulse impact power tool, comprising:

a tool housing;

a display assembly housed within the tool housing, the display assembly including a display screen for displaying graphical information about the operation of the mechanical pulse impact power tool, a printed circuit board operatively coupled to the display screen, the printed circuit board having a first side proximate to the display screen and a second side opposite the first side, the second side of the printed circuit board including control circuitry for the display screen, a rigid spacer between the display screen and the printed circuit board for spacing the display screen apart from the printed circuit board, the rigid spacer defining a plurality of cavities for receiving potting material, the rigid spacer mounted at a back side of the display screen, the back side of the display screen facing the printed circuit board, a boat for supporting the display screen, the printed circuit board, and the rigid spacer, the boat peripherally surrounding the display screen, the printed circuit board, and the rigid spacer, the boat defining an aperture therethrough for providing visibility to the display screen, an elastomeric gasket seated between the printed circuit board and the boat for isolating the display screen; and a protective cover for shielding the display screen, the protective cover disposed on an outside of the tool housing and offset from the display screen to provide a gap between the display screen and the protective cover.

2. The mechanical pulse impact power tool as recited in claim 1, wherein the display screen is a color, high-resolution display screen.

3. The mechanical pulse impact power tool as recited in claim 1, wherein the display screen is connected to the control circuitry by a ribbon cable that wraps around the rigid spacer.

4. The mechanical pulse impact power tool as recited in claim 1, further comprising a plurality of buttons for receiving operator input to the mechanical pulse impact power tool.

5. The mechanical pulse impact power tool as recited in claim 4, wherein the plurality of buttons is integrally formed with the elastomeric gasket.

6. The mechanical pulse impact power tool as recited in claim 4, wherein the printed circuit board includes a plurality of switches on the first side of the printed circuit board mechanically coupled with the plurality of buttons.

7. A power tool comprising:

a housing having a working end and a side separate from the working end;

a user interface supported by the housing and positioned on the side of the housing, the user interface including a display screen; and a display assembly housed within the housing, the display assembly including a display screen for displaying graphical information about the operation of the power tool, a printed circuit board operatively coupled to the display screen, the printed circuit board having a first side proximate to the display screen and a second side opposite the first side, the second side of the printed circuit board including control circuitry for the display screen, a rigid spacer between the display screen and the printed circuit board for spacing the display screen apart from the printed circuit board, the rigid spacer defining a plurality of cavities for receiving potting material, the rigid spacer mounted at a back side of the display screen, the back side of the display screen facing the printed circuit board, a boat for supporting the display screen, the printed circuit board, and the rigid spacer, the boat peripherally surrounding the display screen, the printed circuit board, and the rigid spacer, the boat defining an aperture therethrough for providing visibility to the display screen, and an elastomeric gasket seated between the printed circuit board and the boat for isolating the display screen.

8. The power tool as recited in claim 7, further comprising a protective cover for shielding the display screen, the protective cover disposed on an outside of the housing and offset from the display screen to provide a gap between the display screen and the protective cover.

9. The power tool as recited in claim 7, wherein the display screen is a color, high-resolution display screen.

10. The power tool as recited in claim 7, wherein the display screen is connected to the control circuitry by a ribbon cable that wraps around the rigid spacer.

11. The power tool as recited in claim 7, further comprising a plurality of buttons for receiving operator input to the mechanical pulse impact power tool.

12. The power tool as recited in claim 11, wherein the plurality of buttons is integrally formed with the elastomeric gasket.

13. The power tool as recited in claim 11, wherein the printed circuit board includes a plurality of switches on the first side of the printed circuit board mechanically coupled with the plurality of buttons.

14. A mechanical pulse impact power tool, comprising:

a tool housing; and a display assembly housed within the tool housing, the display assembly including a display screen for displaying graphical information about the operation of the mechanical pulse impact power tool, a printed circuit board operatively coupled to the display screen, the printed circuit board having a first side proximate to the display screen and a second side opposite the first side, the second side of the printed circuit board including control circuitry for the display screen, a rigid spacer between the display screen and the printed circuit board for spacing the display screen apart from the printed circuit board, the rigid spacer defining a plurality of cavities for receiving potting material, the rigid spacer mounted at a back side of the display screen, the back side of the display screen facing the printed circuit board, a boat for supporting the display screen, the printed circuit board, and the rigid spacer, the boat peripherally surrounding the display screen, the printed circuit board, and the rigid spacer, the boat defining an aperture therethrough for providing visibility to the display screen, an elastomeric gasket seated between the printed circuit board and the boat for isolating the display screen.

15. The mechanical pulse impact power tool as recited in claim 14, further comprising a protective cover for shielding the display screen, the protective cover disposed on an outside of the tool housing and offset from the display screen to provide a gap between the display screen and the protective cover.

16. The mechanical pulse impact power tool as recited in claim 14, wherein the display screen is a color, high-resolution display screen.

17. The mechanical pulse impact power tool as recited in claim 14, wherein the display screen is connected to the control circuitry by a ribbon cable that wraps around the rigid spacer.

18. The mechanical pulse impact power tool as recited in claim 14, further comprising a plurality of buttons for receiving operator input to the mechanical pulse impact power tool.

19. The mechanical pulse impact power tool as recited in claim 18, wherein the plurality of buttons is integrally formed with the elastomeric gasket.

20. The mechanical pulse impact power tool as recited in claim 18, wherein the printed circuit board includes a plurality of switches on the first side of the printed circuit board mechanically coupled with the plurality of buttons.

* * * * *